United States Patent
Murthy et al.

(10) Patent No.: US 10,645,773 B2
(45) Date of Patent: May 5, 2020

(54) SYSTEM AND METHOD FOR MANAGING LIGHTING BASED ON POPULATION MOBILITY PATTERNS

(71) Applicant: SIGNIFY HOLDING B.V., Eindhoven (NL)

(72) Inventors: Abhishek Murthy, Arlington, MA (US); Hassan Mohanna, Quincy, MA (US); Sirisha Rangavajhala, Wakefield, MA (US); Olaitan Philip Olaleye, Wakefield, MA (US); Rohit Kumar, Hackensack, NJ (US); Jasleen Kaur, Melrose, MA (US); Alexandru Darie, Lincoln, MA (US); Talmai Brandao De Oliveira, North Andover, MA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/347,809

(22) PCT Filed: Nov. 7, 2017

(86) PCT No.: PCT/EP2017/078477
§ 371 (c)(1),
(2) Date: May 7, 2019

(87) PCT Pub. No.: WO2018/091315
PCT Pub. Date: May 24, 2018

(65) Prior Publication Data
US 2019/0268997 A1    Aug. 29, 2019

Related U.S. Application Data

(60) Provisional application No. 62/423,257, filed on Nov. 17, 2016.

(30) Foreign Application Priority Data

Dec. 15, 2016 (EP) .................................. 16204215

(51) Int. Cl.
H05B 37/02 (2006.01)
G06Q 30/02 (2012.01)
H05B 33/08 (2020.01)

(52) U.S. Cl.
CPC ..... H05B 37/0227 (2013.01); G06Q 30/0261 (2013.01); H05B 37/02 (2013.01); H05B 37/0272 (2013.01); H05B 33/0845 (2013.01)

(58) Field of Classification Search
CPC .......................... H05B 37/0272; H05B 37/02
See application file for complete search history.

(56) References Cited

U.S. PATENT DOCUMENTS 9,980,347 B2 * 5/2018 Petschulat .......... H05B 37/0218
2012/0310703 A1 12/2012 Cavalcanti et al.
2015/0289347 A1 10/2015 Baaijens et al.

FOREIGN PATENT DOCUMENTS

| WO | 2014016729 A1 | 1/2014 |
| WO | 2014147524 A1 | 9/2014 |
| WO | 2016008774 A1 | 1/2016 |

* cited by examiner

*Primary Examiner* — Thuy V Tran
(74) *Attorney, Agent, or Firm* — Daniel J. Piotrowski (57) ABSTRACT

The described embodiments relate to systems, methods, and apparatuses for controlling lights (130) in an area of a city (200) based on demographic data and/or mobility pattern data (120). Using the demographic data and/or the mobility pattern data, the lights can be arranged to attract people (214) to the area (210) where the lights are located. The mobility pattern data can be used to identify when people are typically moving towards the area, in order that the lights can be prepared to attract people in advance of their arrival. Furthermore, an output of the lights can be measured to measure certain characteristics about the lights so that the lights can be adjusted to better appeal to the demographic of people in the area.

14 Claims, 7 Drawing Sheets

SYSTEM AND METHOD FOR MANAGING LIGHTING BASED ON POPULATION MOBILITY PATTERNS

CROSS-REFERENCE TO PRIOR APPLICATIONS

This application is the U.S. National Phase application under 35 U.S.C. § 371 of International Application No. PCT/EP2017/078477, filed on Nov. 7, 2017 which claims the benefit of U.S. Provisional Patent Application No. 62/423,257, filed on Nov. 17, 2016 and European Patent Application No. 16204215.4, filed on Dec. 15, 2016. These applications are hereby incorporated by reference herein.

TECHNICAL FIELD

The present disclosure is directed generally to systems, methods, and apparatuses for controlling and managing network of lights using mobility pattern data and/or demographic data. More particularly, but not exclusively, the described embodiments provide techniques for predicting locations and lighting preferences of people in order to offer more suitable lighting at a given destination as well as detecting faulty lights based on changing mobility patterns of people.

BACKGROUND

Lighting is often used to illuminate metropolitan areas in order to guide people through the metropolitan areas. Typically, such lighting is static and merely turns on and off according to switches that are controlled by individuals responsible for managing the lighting. Although such lighting configurations may be suitable for simply illuminating a location, the lighting may not be able to adapt to changing surroundings of the location. Because certain metropolitan areas are constantly changing, there may be missed opportunities to appeal to persons moving in the metropolitan areas at different times in a day.

Moreover, many communities have traditional un-connected lighting system and will continue to adopt connected solutions at the current low rates. Unconnected lighting systems are not amenable to remote diagnostics. Fault detection is carried out manually by citizens filing complaints and periodic inspections. These maintenance operations are both expensive and slow due to their reactionary nature. Proactive approaches to detecting faulty streetlights, for example, are very beneficial for cities.

SUMMARY

The present disclosure is directed to systems, methods, and apparatus for mobility data and demographic data to manage a lighting system and the maintenance thereof as well as provide an enhanced lighting experience for persons moving around a particular location.

Generally, in one aspect, a method for controlling lights may include, by a computing device: by a computing device: determining, using mobility data corresponding to a group of persons in a city, that the group of persons is located in an area of a city that includes the lights; determining demographic data associated with at least one person in the group of persons; selecting a policy for managing and/or controlling the lights based on the demographic data; and causing the lights to be managed and/or controlled according to the policy.

In various embodiments, the method may further include: determining whether a change in a location of the group of persons occurred in response to the lights being controlled according to the policy, which is then used to manage maintenance operations, such as replacing faulty lights. In various embodiments, the method may further include: when the location of the group of person changes to be less proximate to the area in response to the lights being controlled according to the policy: modifying the policy, and causing the lights to be controlled according to the modified policy.

In various embodiments, causing the lights to be controlled according to the policy includes causing a color temperature of the lights to change. In various embodiments, determining the demographic data includes obtaining census data associated with the area, and inferring demographic data associated with the at least one person based on the census data.

In various embodiments, the mobility data includes call data records and the method further includes: analyzing the call data records (104) to identify a mobility pattern for predicting a subsequent area that the group of persons will be located. In various embodiments, the method may further include: receiving sensor data corresponding to an output of a sensor that is responsive to the lights being controlled according to the policy; and modifying the policy when the sensor data indicates that a lighting characteristic (126) of the lights is outside of a threshold value associated with the policy. In various embodiments, the lighting characteristic is a brightness associated with the lights, and modifying the policy includes adjusting a brightness value for changing the brightness.

In various embodiments, the mobility data includes call data records are used to detect faulty lights based on changing mobility patterns of pedestrians at night times. Changes in the mobility patterns of pedestrians are analyzed to detect faulty lights.

In another aspect, a method may include: receiving lighting condition data corresponding to characteristics of a network of lights (130) located in a first area of a city; identifying demographic data corresponding the people located in a second area (210) of the city; selecting a lighting policy that is associated with the demographic data; and causing the network of lights to operate according to the selected lighting policy.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

The embodiments described herein relate to systems, methods, and apparatuses for enhancing the lighting of retail and non-retail areas of a city using mobility patterns and profiles of persons moving throughout the areas. Such lighting enhancements can reduce congestion while improving the shopping experience for those moving through the retail areas. The retail areas can include outdoor and indoor lighting that can improve the attractiveness of products and storefronts in the retail areas. Lighting controllers can modulate the characteristics of the lights in order to improve the appearance of the retail areas. For example, the lighting controllers can control the intensity and spectral quality of individual lights in various locations of retail areas in order to improve the shopping experience in those retail areas.

Shopping experience can be measured by calculating a shopping/lighting experience index (SEI). The SEI of a retail location can be determined using feedback generated at a retail location. The feedback can be used to make changes to the lighting system that can influence, in part, the SEI of the retail location. The feedback can be based on a color rendering index and/or a correlated color temperature of the lights connected to the lighting system. Furthermore, the feedback can include the movement of pedestrians in or near a retail location after the lighting system has been initialized and/or modified. The movement of pedestrians can be determined using mobility data such as telecommunication data provided by a telecommunications service provider, public data, census data, local area network data, and/or any other personal movement related data. Machine learning techniques can be used to find mobility patterns in the mobility data. The mobility patterns can then be used to optimize the SEI and target specific times and areas to improve the lighting at those times and at those areas.

The system for optimizing the SEI can include one or more devices dedicated to transmitting and analyzing data for use by a lighting control system. The system can include a call data records database that collects call data records, which can indicate the location of persons within an area and a frequency at which the persons visit those areas. The system can also include a light conditions database that can measure and characterize the lighting output of different areas in a city. For example, the light conditions database can store information related to the luminance and spectral quality of different retail and non-retail locations within a city. The system can also manage one or more SEI models for various locations in a city. An SEI model can quantify the SEI in order to characterize the impact of lighting on shopping experience in different locations of a retail area.

The system for optimizing the SEI can further include a mobility prediction engine. The mobility prediction engine can perform data analytics for analyzing the call data records in order to estimate and/or identify mobility patterns of persons around a retail location. Patterns can be identified for pedestrians as well as vehicular commuters traveling to and from the retail locations. The system can further include an SEI enhancer that can develop policies for enhancing the SEI models using the mobility patterns and feedback data. The lighting conditions at various retail locations can be identified and compared to the SEI models to determine the lighting conditions that result in the highest SEI. Optimal lighting conditions can be learned over time by observing pedestrians move around the various retail locations. Furthermore, new lighting schemes can be developed from the mobility patterns depending on how the mobility patterns change in response to modifications to the luminance and spectral quality of the lights of the lighting system. New lighting schemes can be tested and verified by the SEI enhancer, and thereafter stored when it is determined that the new lighting schemes improved the SEI. The light schemes can be employed by a lighting control system that is connected to a network of adjustable lights that can change dynamically according to the policies of the SEI enhancer.

An SEI can be based on multiple metrics related to the movement of persons near an area. The SEI can be based on the number or percentage of pedestrians that pass or stop in front of a retail location, the number or percentage of pedestrians entering the retail locations, and/or the appearance of the retail locations or items associated with the retail locations under certain lighting conditions. These values can be combined using a weighted average that reflects the demographic profiles for different retail locations.

Figure 1:
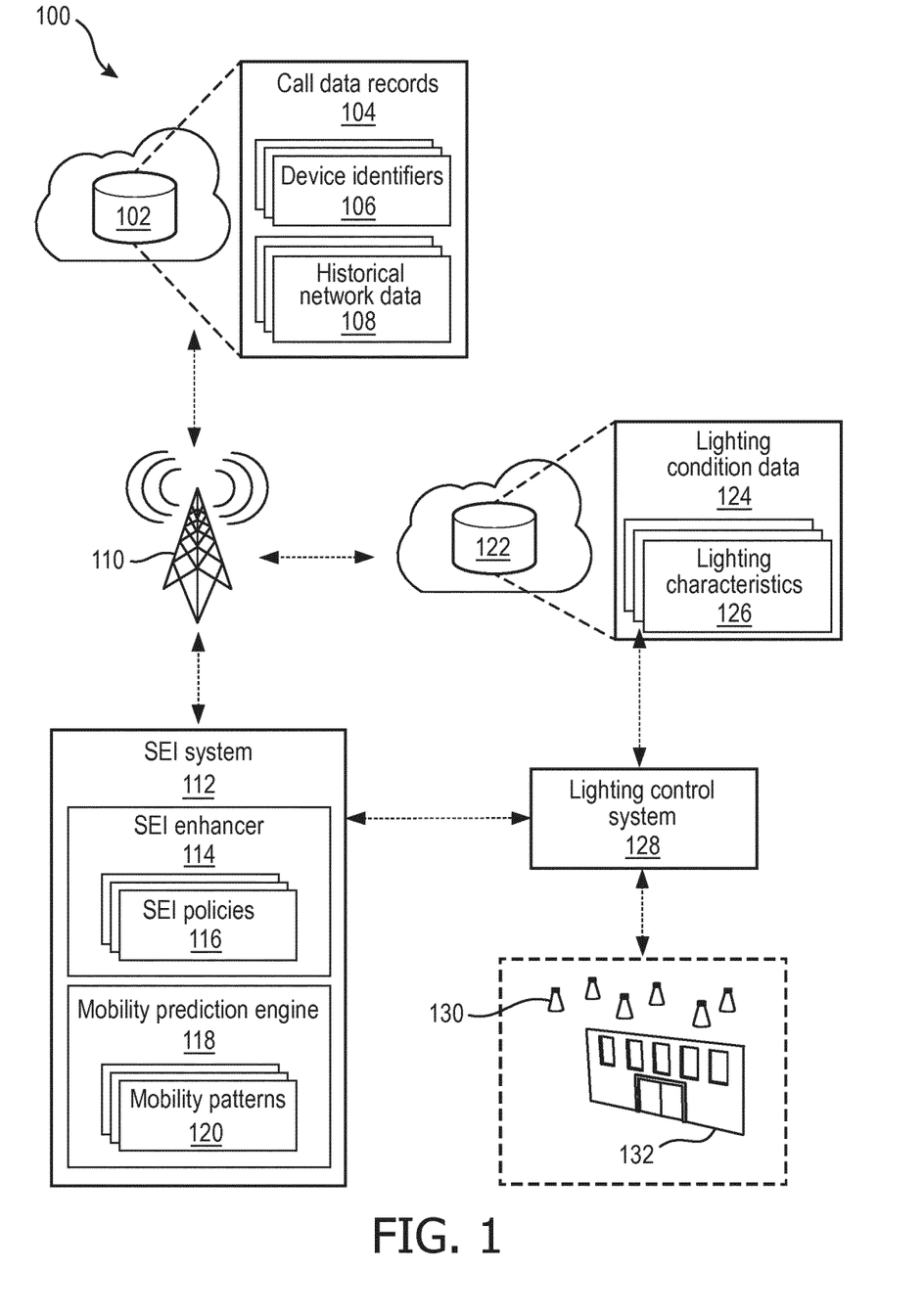
FIG. 1 illustrates a diagram of a system for improving the shopping experience of retail locations in a city by adapting the lighting in the retail locations based on different data.

FIG. 1 illustrates diagram 100 of a system for improving the shopping experience of retail locations in a city by adjusting the lighting at the retail locations based on data related to the movement of people through the city. The system 100 can include a call records database 102 that can store call data records 104. The call data records 104 can include device identifiers 106 corresponding to the devices people use to communicate over a cell network or other network. Furthermore, the call data records 104 can include historical network data 108. The historical network data 108 can include information that identifies the locations in which a device has placed a call or connected to a network (e.g., the internet). For example, the historical network data 108 can identify cell towers or locations of cell towers that the device has connected to. In this way, a device identifier 106 can be tracked geographically to determine whether a device is moving within a city or retail location. In some embodiments, the historical network data 108 can include global positioning system data that identifies specific geographic locations where a device has moved. Furthermore, the call records database 102 can include any information suitable for identifying the location of a device at a current or previous time.

The system can further include a lighting database 122 that includes lighting condition data 124 related to one or more areas 132 of a city that are illuminated by a network of luminaires 130 that are controlled by a lighting control system 128. The lighting database 122 can store information related to the locations and lighting characteristics 126 of different networks of luminaires 130 across a city. Specifically, the lighting characteristics 126 can include information such as luminance, brightness, spectral quality, color temperature, hue, tint, tone, wave length, and/or any other metric that can describe a light characteristic. The lighting database 122 can gather the lighting condition data 124 using sensors located at or near the areas 132 where the networks of luminaires 130 are illuminated. Alternatively, the lighting database 122 can gather lighting condition data 124 directly from the lighting control system 128. The lighting control system 128 can use color quality indices such as a color rendering index (CRI) and/or a correlated color temperature (CT) to accurately make changes to the network of luminaires 130. Changes can be recorded by the lighting control system 128 and transmitted to the lighting database 122. In some embodiments, the lighting database 122 is part of the lighting control system 128.

The lighting control system 128 can be directly or indirectly controlled by an SEI system 112. The SEI system 112 can be in communications with the call records database 102 and the lighting database 122 over a network 110. The SEI system 112 can include one or more devices that operate software that include an SEI enhancer 114 and a mobility prediction engine 118. The SEI enhancer 114 can use the lighting condition data 124 and the call data records 104 to create SEI policies 116 for improving the appearance of the network of luminaires 130. The mobility prediction engine 118 can identify mobility patterns 120 from the call data records 104 in order to provide feedback to the SEI enhancer 114 for improving the lighting of the network of luminaires 130 to attract people to the areas 132. For example, the SEI system 112 can compare the lighting condition data 124 with the mobility patterns 120 to identify the lighting characteristics 126 that encourage people to move to the area 132. If the lighting condition data 124 does not encourage people to move to the area 132, the SEI policies 116 can be updated with new instructions for the lighting control system 128. The SEI policies 116 can be employed by the lighting control system 128 in order that the SEI system 112 can identify the SEI policies 116 that result in mobility patterns 120 associated with movement of people toward the area 132. The SEI policies 116 can correspond to instructions for controlling the network of luminaires 130 of the lighting control system 128.

Figure 2A:
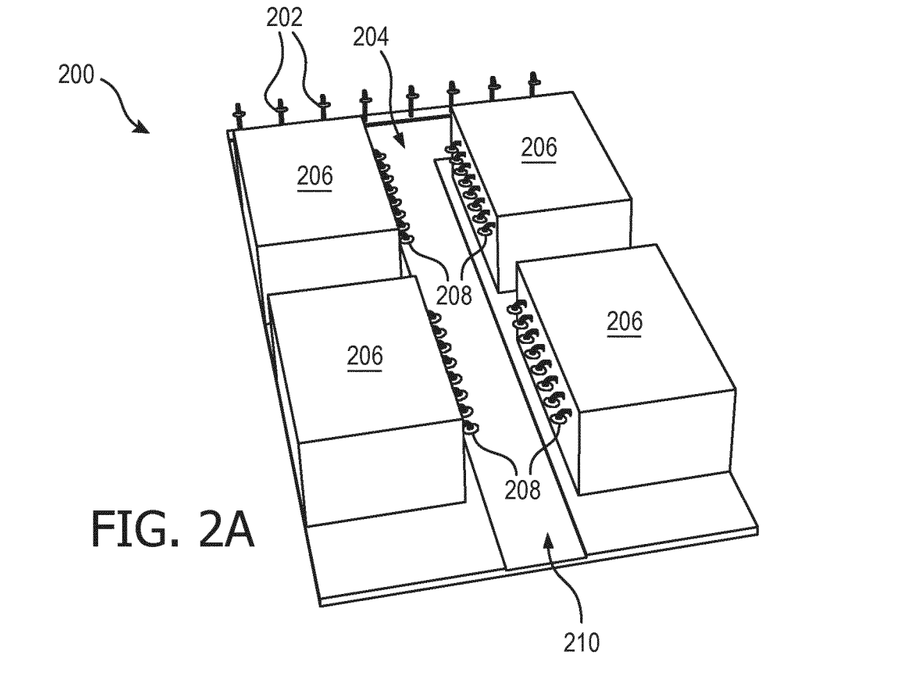
FIGS. 2A-2C illustrate how lighting characteristics can be modified by the system to encourage the movement of people toward or away from areas of a city.
Figure 2B:
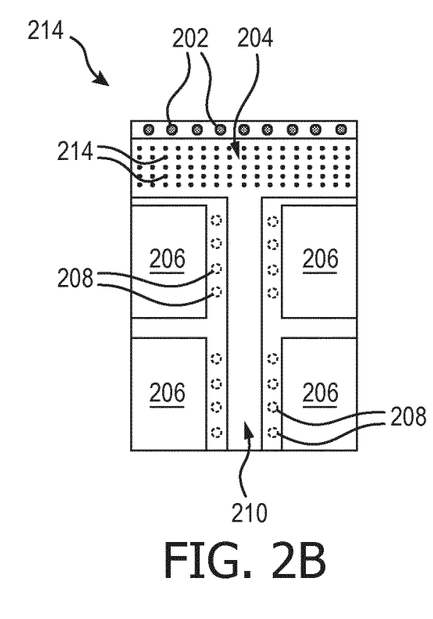
Figure 2C:
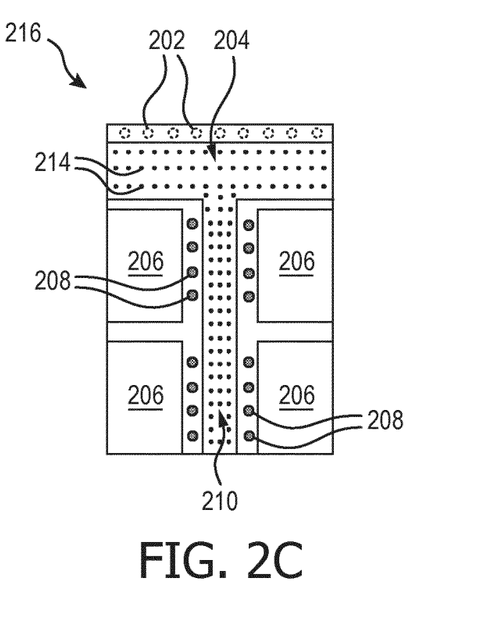

FIGS. 2A-2C illustrate how lighting characteristics can be modified by the system 100 to encourage the movement of people toward or away from areas of a city. Specifically, FIG. 2A illustrates an area 200 of a city that includes retail locations 206. The retail locations 206 can include stores that having retail lighting 208 that illuminates an exterior and/or an interior of the retail locations 206. A first street 204 can include street lighting 202 that illuminates the first street 204, which provides an inlet to and an outlet from the retail locations 206. A second street 210 can be illuminated by the retail lighting 208 and provide a pathway to and from the entrances of the retail locations 206. Each light of the street lighting 202 and the retail lighting 208 can be adjusted by the lighting control system 128 according to SEI policies 116 implemented by the SEI system 112.

FIGS. 2B and 2C illustrate diagram 214 and diagram 216 showing how the movement of people 212 through an area 200 can be influenced by street lighting 202 and retail lighting 208. Specifically, the diagram 214 can be a top view of the area 200 at a time when the people 212 are moving through the first street 204. Such movement of the people 212 can be predicted by the SEI system 112. In order to encourage the movement of the people 212 to the second street 210 where the retail locations 206 are, the SEI system 112 can cause the retail lighting 208 and the street lighting 202 to change. Specifically, lighting condition data 124 corresponding to the current lighting conditions of the street lighting 202 and the retail lighting 208 can be retrieved by the SEI system 112. Furthermore, the mobility patterns 120 for the area 200 can be retrieved and analyzed to determine the best SEI policy to implement at the area 200. In some embodiments, public data corresponding to a public profile of the individuals in or near the area 200 can be retrieved and analyzed to determine the best SEI policy to implement at the area 200.

Once an SEI policy has been selected by the SEI system 112, the SEI policy can be transmitted to the lighting control system 128 in order to alter the lighting characteristics of the street lighting 202 and the retail lighting 208. For example, FIG. 2C illustrates a diagram 216 of the area 200 after an SEI policy has been implemented to encourage the movement of the people 212 from the first street 204 to the second street 210. Specifically, FIG. 2C illustrates the change of the street lighting 202 and the retail lighting 208 compared to FIG. 2B (e.g., shading on the retail lighting 208 and street lighting 202 can indicate different lighting characteristics).

The lighting control system 128 can detect whether the people 212 moved from the first street 204 to the second street 210 in response to the change in the SEI policy implemented by the lighting control system 128. If the SEI policy is successful in encouraging the movement of people 212 from the first street 204 to the second street 210, the SEI policy can be stored with the other SEI policies 116. If the SEI policy is not successful in encouraging the movement of people 212 from the first street 204 to the second street 210, the SEI policy can be modified by the SEI system 112 until a more suitable SEI policy is developed.

In some embodiments, the SEI policies 116 can be stored with a tag that identifies the area 200 and/or a tag that identifies the type of movement encouraged by the SEI policy. For example, a tag can be used to categorize an SEI policy as a toward policy, a stay policy, or a leave policy. A toward policy can be SEI policy that encourages the movement of people 212 toward the area 200, and a leave policy can be an SEI policy that encourages the movement of people 212 away from the area 200. A leave policy can be an SEI policy that illuminates the street lighting 202 more than the retail lighting 208, in order that the people 212 will be encouraged to leave the second street 210 and/or retail locations 206. A stay policy can be an SEI policy that encourages the people 212 to stay at the retail locations 206 and/or the second street 210. The stay policy can be a static lighting arrangement or a dynamic lighting arrangements that appeal to the people 212 at the retail locations 206. For example, a dynamic lighting arrangement can be employed by the lighting control system 128 at retail locations 206 whose typical demographic is younger than most people. Demographic information can be obtained by the SEI system 112 by analyzing public data available to the SEI system 112.

In some embodiments, distribution of people 212 throughout the area 200 can be encouraged by the SEI system 112 by using different SEI policies 116 at different locations within the area 200. For example, SEI policies can be used at different locations within the area 200 at different times in order to encourage movement and distribution of people 212 throughout the area 200. Because people 212 may gather as certain locations over other locations, SEI policies can be used to encourage some people 212 to leave certain locations and move to other locations. For example, the lighting control system 128 can employ a stay SEI policy at a first retail location for a period of time, and then switch to a leave SEI policy after the period of time. Simultaneously, the lighting control system 128 can employ a toward SEI policy at a second retail location in order to further encourage the movement of people 212 from the first retail location to the second retail location. Specifically, the first retail location can exhibit a dynamic lighting pattern followed by a static lighting pattern, while the second retail location can exhibit a static lighting patterns followed by a dynamic lighting pattern.

Figure 3:
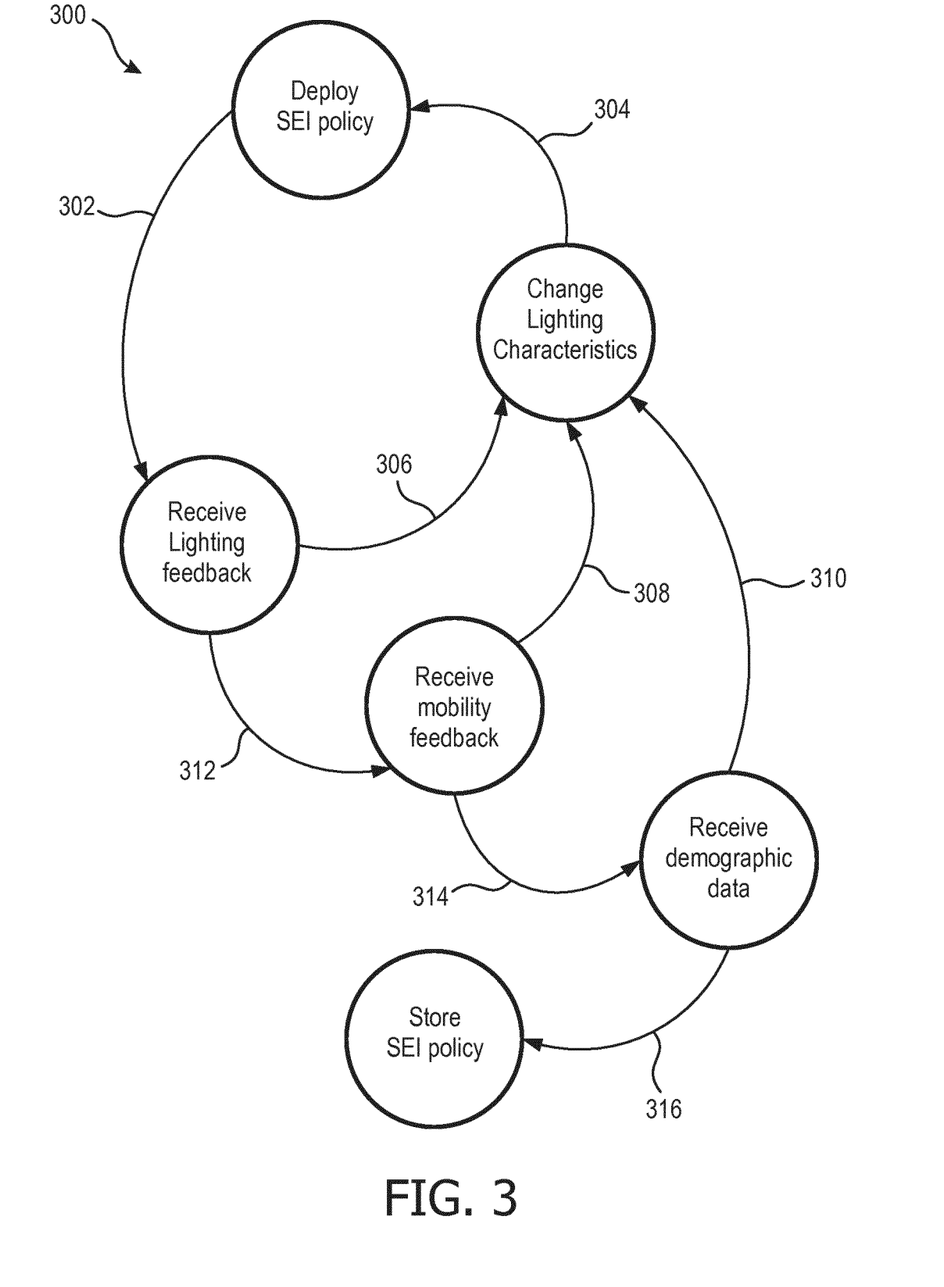
FIG. 3 illustrates a logic diagram for modifying an SEI policy to improve the SEI policy for purposes of improving the SEI index for an area of a city.

FIG. 3 illustrates a logic diagram 300 for modifying an SEI policy for improving the SEI index for an area of a city. The logic diagram 300 can be coded as software for the SEI system 112 and/or the SEI enhancer 114. Initially, an SEI policy can be deployed by an SEI system and implemented by a lighting control system that controls a network of luminaires in the area of a city. The logic diagram 300 can begin at process 302 where the SEI policy is deployed to a lighting control system. Once the SEI policy has been deployed by the lighting control system, the SEI system can receive feedback regarding the accuracy of the lighting output of the lighting control system. The feedback can be provided by sensors that generate signals to the SEI system based on the lighting output of the network of luminaires controlled by the lighting control system. The sensors can be located proximate to one or more of the luminaires around the city. The signals can indicate a quality metric for the lighting output of the network of luminaires. The quality metric can be based on a color rendering index and/or a correlated color temperature of one or more of the luminaires of the network of luminaires. If the SEI system receives feedback indicating that the luminaires are not accurately projecting the color of light intended by the SEI system, then by process 306, the SEI system can change one or more lighting characteristics of the luminaires. Furthermore, once the lighting characteristics have been adjusted according to the lighting feedback, then by process 304, the SEI policy can be deployed with the adjusted lighting characteristics.

If the SEI system receives feedback indicating that the luminaires are accurately projecting the color of light intended by the SEI system, then by process 312, mobility feedback can be received and analyzed by the SEI system. The mobility feedback can indicate whether the deployed SEI policy has been successful in influencing the mobility patterns of people in the area illuminated by the luminaires. For example, the SEI policy can be deployed in order to attract people toward the area illuminated by the luminaires. If the SEI policy is unsuccessful in influencing the mobility patterns of the people in the area illuminated by the luminaires, then by process 308, the lighting characteristics of the SEI policy can be changed. For example, a color or color temperature of the light provided by the luminaires can be changed in order to influence the mobility patterns of the people in the area illuminated by the luminaires. If the SEI policy is successful in influencing the mobility patterns of the people, then by process 314, demographic data of the people can be received by the SEI system. The demographic data can be public data such as census data available over a network connection between the SEI system and servers that make the demographic data available. Additionally or alternatively, in some embodiments, the demographic data can be captured by sensors located in the area illuminated by the luminaires. The sensors can include cameras that can capture images of people in public areas in order that demographic data can be gleaned from the images. For example, the images can be analyzed by the SEI system or another device using facial recognition algorithms or other artificial intelligence algorithms that can identify features about the people in the area illuminated by the luminaires. Using data related to these identified features, the SEI system can determine whether the deployed SEI policy is suitable for attracting the demographic of people in the area. For example, if the deployed SEI policy includes instructions for the lighting control system to control the luminaires in a dynamic pattern and the demographic data corresponds to a younger demographic, the SEI policy can be tagged by the SEI system as being appropriate for that demographic. Furthermore, by process 316, the SEI policy can then be stored as being suitable for the particular area and/or time that the SEI policy is being deployed. However, if the deployed SEI policy includes instructions for illuminating the luminaires in a static pattern and the demographics data corresponds to a younger demographic, the SEI policy can be tagged by the SEI system as inappropriate for that demographic. If the SEI policy is determined to be inappropriate for the demographic identified in the received demographic data, then by process 310, the lighting characteristics can be changed in order to be more attractive to the identified demographic.

Figure 4:
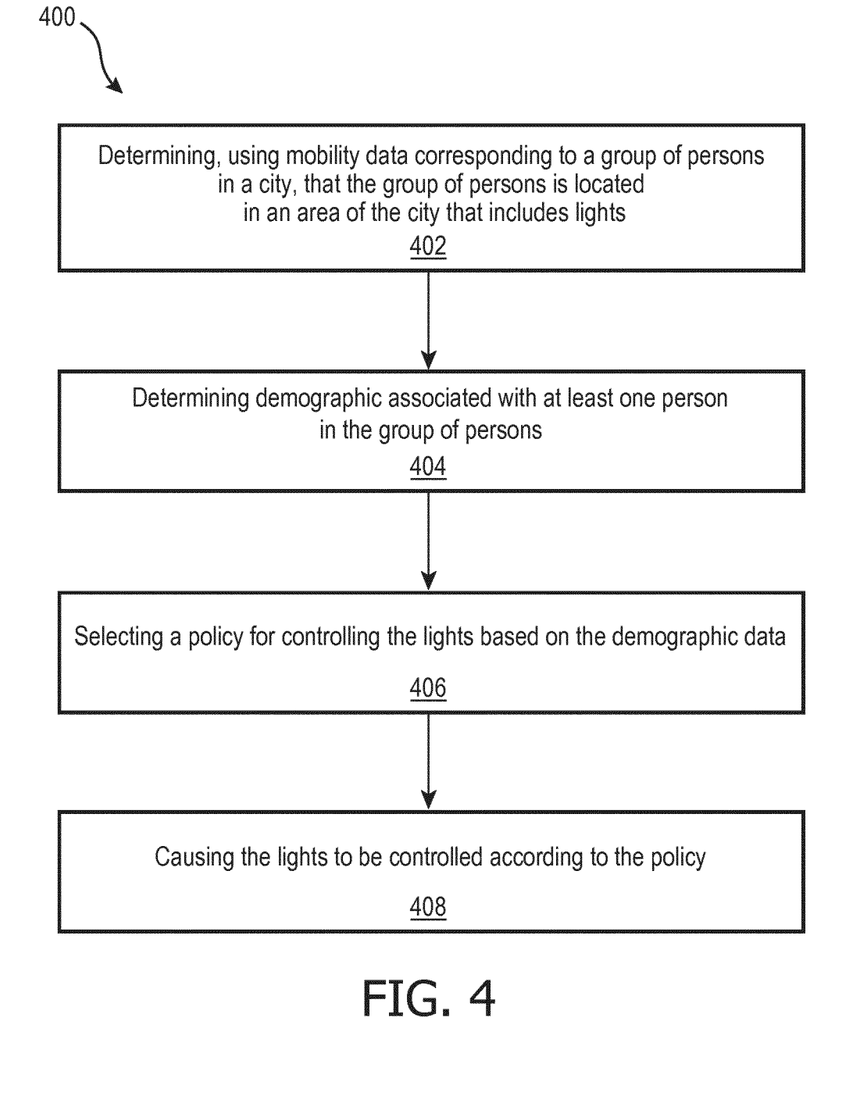
FIG. 4 illustrates a method for controlling lights in an area of a city based on demographic data.

FIG. 4 illustrates a method 400 for controlling lights in an area of a city based on demographic data. The method 400 can be performed by an SEI system, a lighting control system, and/or any other device or apparatus suitable for controlling a network of lights. The method 400 can include a block 402 of determining, using mobility data corresponding to a group of persons in a city, that the group of persons is located in an area of the city that includes lights. The mobility data can include call data records and/or public data that indicates a current and/or previous location of persons in the city.

The method 400 can also include a block 404 of determining (e.g., receiving) demographic data associated with at least one person in the group of persons. In some embodiments, the demographic data may be accessed over a public network and may include website and/or web application data that is indicative a demographic of persons in the area of the city. The demographic data may also be determined from camera data provided by cameras located in the area of the city. The camera data can be analyzed to derive the demographic data and identify features of people in the area such as age and gender. Additionally or alternatively, in some embodiments, census data corresponding to people living in the area may be obtained and projected onto the mobility patterns, e.g., and it may be assumed or predicted that people forming the mobility pattern conform to demographic data inferred from the census data.

At block 406, a policy for controlling the lights based on the demographic data can be selected. The policy can be selected from multiple policies that are designed to influence the mobility patterns of persons moving in or around the area of the city. At block 408, the lights are caused to be controlled according to the policy. For example, the policy can include a set of instructions that are executed by a control system that controls the lights.

Figure 5:
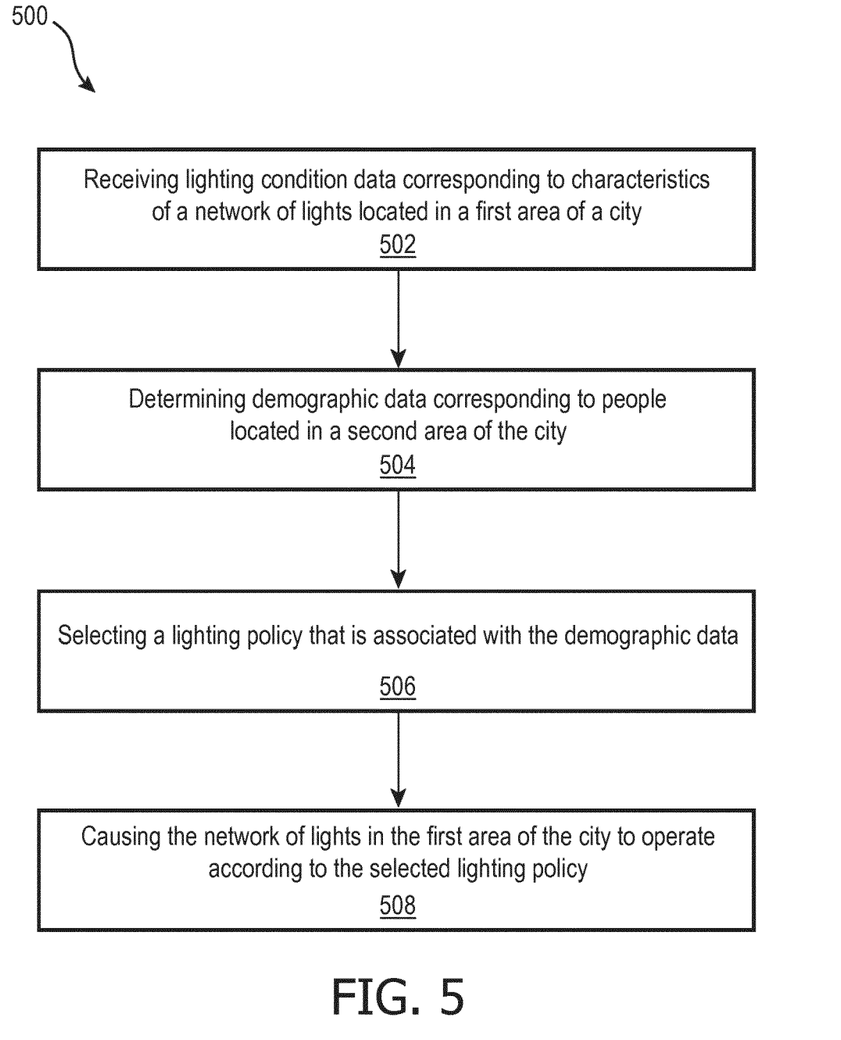
FIG. 5 illustrates a method for changing a lighting policy of an area of a city to attract people from another area of a city.

FIG. 5 illustrates a method 500 for changing a lighting policy of an area of a city to attract people from a second area of a city. The method 500 can include a block 502 of receiving lighting condition data corresponding to characteristics of a network of lights located in a first area of a city. The lighting condition data can be based on sensor measurements taken by sensors in the first area of the city. For example, the sensors can include cameras that can capture light from the network of lights for determining a color temperature of the lights.

At block 504, demographic data that corresponds to the people located in the second area of the city may be determined. In some embodiments, the demographic data may be accessed through public networks (e.g., demographics inferred from census data associated with the first and/or second area and projected onto the mobility pattern) or may be derived from sensor data that is based on images of the people located in the second area of the city.

At block 506, a lighting policy that is associated with the demographic data can be selected. The lighting policy can be selected from multiple lighting policies that can be designed to attract different demographics. For example, a lighting policy can correspond to a dynamic lighting pattern that is designed to attract a younger demographic of persons. At block 508, the network of lights in the first area of the city is caused to operate according to the selected lighting policy. In this way, the lights in the first area of the city can attract a primary demographic of persons from the second area of the city.

Figure 6A:
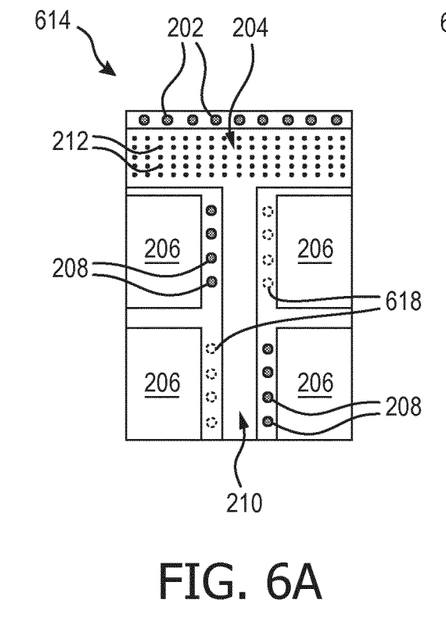
FIG. 6A-6B illustrate how mobility patterns are used to detect faulty lighting in areas of a city.
Figure 6B:
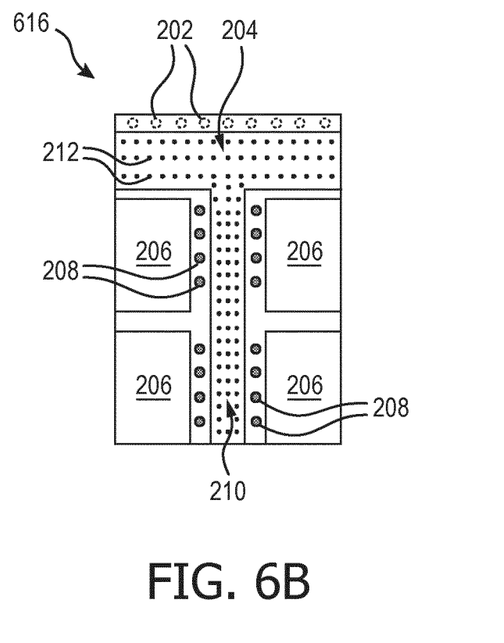

FIGS. 6A-6B illustrate how mobility patterns are used to detect faulty lighting in areas of a city. Specifically, FIG. 2A-6B illustrates an area 200 of a city that includes retail locations 206. The retail locations 206 can include stores that having retail lighting 208 that illuminates an exterior and/or an interior of the retail locations 206. A first street 204 can include street lighting 202 that illuminates the first street 204, which provides an inlet to and an outlet from the retail locations 206. A second street 210 can be illuminated by the retail lighting 208 and provide a pathway to and from the entrances of the retail locations 206. Each light of the street lighting 202 and the retail lighting 208 can be adjusted by the lighting control system 128 according to SEI policies 116 implemented by the SEI system 112.

FIG. 6B illustrates diagram 616 showing how the movement of people 212 through an area 200 (which may be influenced by street lighting 202 and retail lighting 208). Specifically, the diagram 616 is a top view of the area 200 at night time when the people 212 are moving through the first street 204 and in second street 210 in a high mobility or density patterns. Such movement of the people 212 can be predicted by the SEI system 112. The mobility patterns 120 for the area 200 can be retrieved and analyzed to determine which streets are being trafficked by people 212 and if this mobility pattern is consistent with the SEI policy 116 being implemented for area 200.

FIG. 6A shows a change in mobility pattern is detected, wherein a low mobility or density pattern is shown in second street 210 and a higher mobility or density pattern is shown in first street 204. The SEI system 112 can select a new the lighting (SEI) policy, the lighting policy can be transmitted to the lighting control system 128 in order to alter the lighting characteristics of the street lighting 202 and the retail lighting 208. For example, a lighting policy can be implemented to encourage the movement of the people 212 from the first street 204 to the second street 210.

The lighting control system 128 can detect whether the people 212 moved from the first street 204 to the second street 210 in response to the change in the SEI policy implemented by the lighting control system 128. If the lighting policy is successful in encouraging the movement of people 212 from the first street 204 to the second street 210, the lighting policy can be stored with the other lighting policies 116. If the lighting policy is not successful in encouraging the movement of people 212 from the first street 204 to the second street 210, the mobility patterns (or non-movement) of people 212 to second street 210 can be analyzed to determine other factors or causes of the mobility pattern.

As shown in FIG. 6A, one cause of the changed mobility pattern may be faulty lighting 618, as shown by the dashed lined marking on the retail lighting 208 and/or street lighting 202. The changed mobility pattern is analyzed to determine which streets or areas have increased or decreased mobility patterns and correlate the data to possible faulty street lighting 202 and/or the retail lighting 208. By correlating mobility patterns of people 212 (which for example avoid second street 210 at night in FIG. 6A) faulty street lighting 618 can be determined or located to particular streets or areas 200 of a city.

In some embodiments, the correlation can be further confirmed by using tagged lighting (SEI) policies 116 (as described above, a categorized lighting policy such as a toward policy, a stay policy, or a leave policy). If the after using one or more tagged lighting policies in the area 200, there is no movement of people 212 to/from the first street 204 to the second street 210 (as expected by the respective lighting policy), then one more faulty street lighting 202 and/or retail lighting 208 is determined to be the cause.

Alternatively, the lighting control system 128 can automatically analyze changes in mobility patterns on first street 204 and second street 210 (without changing the SEI policy) and correlate them to faulty street lighting 202 and the retail lighting 208.

Lastly, an additional sub-system can be used to cross-reference the determined faulty street lighting 202 and the retail lighting 208 locations with night-time satellite images.

Figure 7:
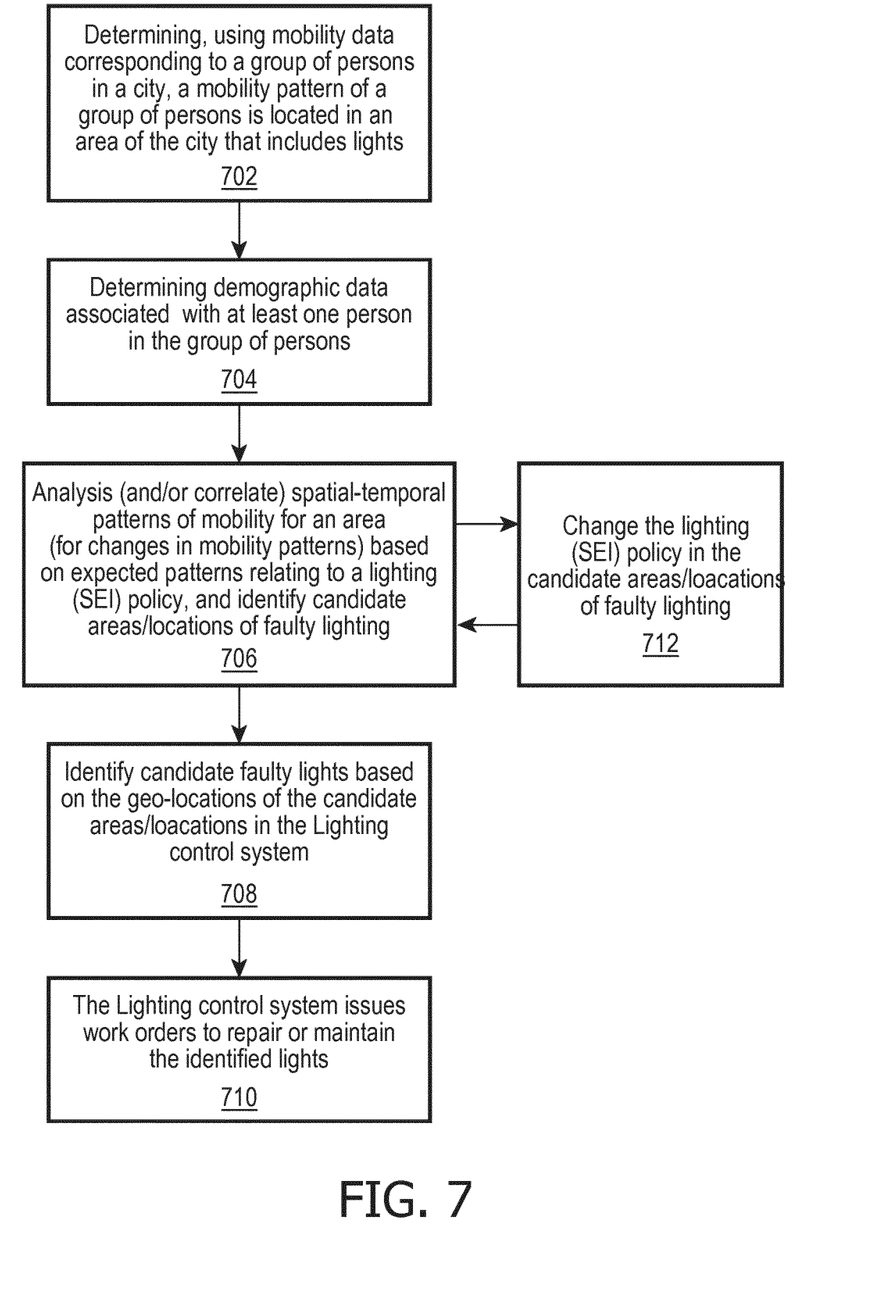
FIG. 7 illustrates a method for detecting faulty lighting in areas of a city using mobility patterns.

FIG. 7 illustrates a method for detecting faulty lighting in areas of a city using mobility patterns. The method 700 can be performed by an SEI system, a lighting control system, and/or any other device or apparatus suitable for controlling a network of lights. The method 700 can include a block 702 of determining, using mobility data corresponding to a group of persons in a city, a mobility pattern of a group of persons is located in an area of the city that includes lights, wherein the area of the city has a predetermined lighting (SEI) policy. The mobility data can include call data records and/or public data that indicates a current and/or previous location of persons in the city. The mobility data is used to build patterns of mobility for different times of the day.

The method 700 can also include a block 704 of determining (e.g., receiving) demographic data associated with at least one person in the group of persons. In some embodiments, the demographic data may be accessed over a public network and may include website and/or web application data that is indicative a demographic of persons in the area of the city, such as pet-owners, who might walk their pets at night time, people who commute at night-times and those who jog during the night. The demographic data may also be determined from camera data provided by cameras located in the area of the city. The camera data can be analyzed to derive the demographic data and identify features of people in the area such as age and gender. Additionally or alternatively, in some embodiments, census data corresponding to people living in the area may be obtained and projected onto the mobility patterns, e.g., and it may be assumed or predicted that people forming the mobility pattern conform to demographic data inferred from the census data. The mobility patterns, for example mined using CDRs, can be used to assess the impact of carrying out repair services for a given light pole at different times of the day on the traffic. Thus, the service provider can concurrently minimize mean-times-to-repair and the impact of traffic.

At block 706, spatio-temporal patterns of mobility are periodically analyzed for anomalies. For example, threshold mobility patterns for an area 200 or street are determined over a period of time (for different times of a day/year). Any deviations from nominal mobility patterns are localized to yield candidate locations (e.g. streets (204, 210 or areas 200 of the city) with faulty lighting 618. The candidate locations of potential faulty lighting 618 may be cross-referenced with satellite images to increase the confidence in predictions (not shown). The mobility patterns resulting from different lighting (SEI) policies can also be correlated, as further described below.

At block 712, the lighting (SEI) policies 116 is changed. If the after using one or more lighting (SEI) policies in the area 200, there is no movement of people 212 to/from the first street 204 to the second street 210 (as expected by the respective lighting (SEI) policy), then one more faulty street lighting 202 and/or retail lighting 208 may be determined to be the cause. In particular, the mobility pattern is analyzed to determine which streets or areas have increased or decreased mobility patterns and further correlate the data to possible faulty lighting, based on the expected mobility patterns of the respective lighting (SEI) policy. The resulting mobility patterns (e.g. current and previous mobility patterns) from different lighting (SEI) policies are correlated to determine or further define the candidate areas of faulty lighting.

At block 708, once the candidate locations are identified, a lookup is performed to yield candidate lights (130) (or light poles) based on the geo-locations of the lights 130 in the candidate location using the data in the Lighting control system 128.

At block 710, once the lights 130 associated with the candidate locations are identified, the Lighting control system 128 will issue work orders to repair or maintain the lights 130.

The priority of work orders depends not only on a failure, but also on the geolocation. If a faulty lighting 618 is on a major road or an intersection fails, for example based on a higher traffic density (as determined using the mobility data), it should have higher priority to be fixed than a faulty lighting 618 on a rural road with a lower traffic density (as determined using the mobility data). The priority of different area types can be derived from standards and regulations. Also, if traffic information is collected through the Lighting control system 128, the priority could be set proportional to the amount of traffic.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method for managing lights a in plurality of areas, the method comprising, by a computing device:
   determining demographic data associated with at least one person in a group of persons;
   selecting a policy for controlling the lights in the plurality of areas based on the determined demographic data;
   causing the lights to be controlled according to the policy;
   determining, using mobility data, a mobility pattern of the group of persons in the plurality of areas by analyzing the mobility data associated with personal devices of the at least one person;
   determining an expected mobility pattern based on the policy;
   analyzing a change in the mobility pattern to determine candidate areas of faulty lighting, by correlating a change in the mobility pattern from a first area and a second area of the plurality of areas, and the expected mobility pattern based on the policy, and
   identifying candidate faulty lights based on geo-locations of lights in the candidate areas.

2. The method of claim 1, further comprising:
   changing the policy for controlling the lights;
   causing the lights to be controlled according to the changed policy;
   analyzing a resulting mobility pattern to correlate candidate areas of faulty lighting with a previous policy's mobility pattern.

3. The method of claim 1, further comprising:
   when a location of the group of persons changes to be less proximate to the area in response to the lights being controlled according to the policy based on an expected mobility pattern for the policy:
   modifying the policy, and
   causing the lights to be controlled according to the modified policy.

4. The method of claim 1, wherein causing the lights to be controlled according to the policy includes causing a color temperature of the lights to change.

5. The method of claim 1, wherein determining the demographic data includes obtaining census data associated with the area, and inferring demographic data associated with the at least one person based on the census data.

6. The method of claim 1, wherein the mobility data includes call data records and the steps further include:
   analyzing the call data records to identify a mobility pattern for predicting a subsequent area that the group of persons will be located.

7. The method of claim 1, further comprising:
   receiving sensor data corresponding to an output of a sensor that is responsive to the lights being controlled according to the policy; and
   modifying the policy when the sensor data indicates that a lighting characteristic of the lights is outside of a threshold value associated with the policy.

8. The method of claim 7, wherein the lighting characteristic is a brightness associated with the lights, and modifying the policy includes adjusting a brightness value for changing the brightness.

9. A non-transitory computer readable medium configured to store instructions that when executed by one or more processors of a computing device, cause the computing device to perform steps that include:
   receiving lighting condition data corresponding to characteristics of a network of lights located in a plurality of areas ;
   identifying demographic data corresponding to people located in the plurality of areas;
   receiving network data associated with personal devices of the people;
   analyzing the network data to identify a mobility pattern of the people in the area;
   selecting a lighting policy that is associated with the demographic data; and
   causing the network of lights to operate according to the selected lighting policy
   determining an expected mobility pattern based on the policy;
   analyzing a change in the mobility pattern to determine candidate areas of faulty lighting, by correlating a change in the mobility pattern from a first area and a second area of the plurality of areas, and the expected mobility pattern based on the policy,
   identifying candidate faulty lights based on the geo-locations of the candidate areas.

10. The non-transitory computer readable medium of claim 9, wherein causing the network of lights to operate according to the selected lighting policy includes transmitting data corresponding to the selected lighting policy to a light control system connected to the network of lights.

11. A system for managing a network of lights, the system comprising:
    a storage device configured to store network data corresponding to personal devices of people moving in a plurality of areas;
    a mobility prediction engine configured to analyze the network data to identify a mobility pattern of the people moving in the plurality of areas;
    a lighting control system configured to generate a lighting policy for the plurality of areas, wherein the lighting policy includes data that correlates the mobility pattern to a lighting characteristic for the network of lights, determine an expected mobility pattern based on the lighting policy, control a network of lights according to the mobility pattern of the people, analyze a change in the mobility pattern to determine candidate areas of faulty lighting, by correlating a change in the mobility pattern from a first area and a second area of the plurality of areas, and the expected mobility pattern based on the lighting policy, and identify candidate faulty lights based on the geo-locations of the candidate areas.

12. The system of claim 11, wherein the lighting characteristic is a color temperature of the network of lights.

13. The system of claim 11, wherein the storage device is further configured to store demographic data of the people moving in the area, and the lighting policy includes data that correlates the demographic data to the lighting characteristic for the network of lights.

14. The system of claim 11, wherein the lighting control system is further configured to: change the policy for controlling the lights, cause the lights to be controlled according to the changed policy, analyze a resulting mobility pattern to correlate candidate areas of faulty lighting with a previous policy's mobility pattern.

* * * * *